C. A. FAIRFIELD.
Calipers.
No. 39,281.  Patented July 21, 1863.
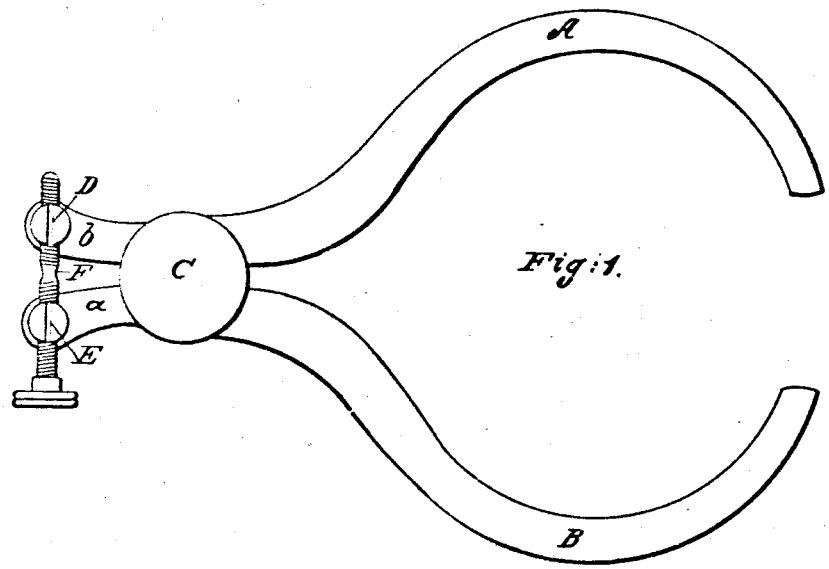
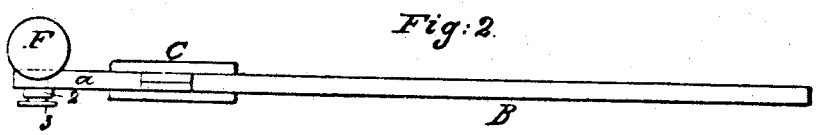
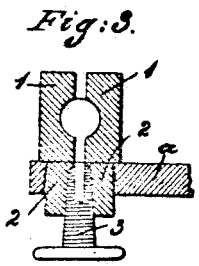
Witnesses:
C. J. Burnett.
Milton Bradley.
Inventor
C. A. Fairfield

UNITED STATES PATENT OFFICE.

CHARLES A. FAIRFIELD, OF SPRINGFIELD, MASSACHUSETTS.

IMPROVEMENT IN CALIPERS.

Specification forming part of Letters Patent No. 39,281, dated July 21, 1863.

*To all whom it may concern:*

Be it known that I, CHARLES A. FAIRFIELD, of Springfield, in the county of Hampden and Commonwealth of Massachusetts, have invented new and useful Improvements in Calipers or Compasses; and I do hereby declare that the following is a full, clear, and exact description of the same, reference being had to the accompanying drawings, making a part of this specification.

My invention relates to calipers or compasses, in which it is desirable to confine the legs in a fixed position, and at the same time have them capable of being accurately adjusted.

In the drawings I have only shown my device applied to calipers, but of course it is as applicable to compasses or dividers, the only difference being in the form of the legs.

A B are the legs; C, the joint formed by crossing the legs, halving them together and confining with a rivet or screw.

a b are parts of A B extended back of the joint. D E are nuts of peculiar construction, fitted into and turning in the arms a b.

F is a right and left hand screw working through the nuts D E—*i. e.*, the portion of the screw working in one nut is cut with a right-hand thread and the portion in the other nut with a left-hand thread. Thus, by turning the screw F the arms a b, and consequently the legs A B, are moved farther apart or nearer together; but as the nuts must turn in the arms as the arms are moved by the screw F, there is a liability to wear and consequent looseness in the joint; also, if the nuts are solid, merely tapped out for the screw, there would be no way to take up the wear of the screw in the nut, and consequently there would very soon be so much looseness or backlash that the instrument would be useless. Now, I overcome the wear in both these places by forming a clamp-nut, (seen more clearly in Figure 3,) in which 1 1 is the body portion of the nut. 2 2 is a shank portion of the same. This stem or shank 2 2 is slightly conical in form, being a little smaller next to the body of the nut. Now, this nut is formed in two parts, being separated through its axis.

3 is a tapering screw entering the lower end of shank 2 2. The hole through the arm a or b is made larger at the side of the arm opposite from the screw F. Now, as the taper-screw 3 enters the nut the two halves are forced apart at the lower end—*i. e.*, at the end next to the taper-screw—until they fill the hole in the arm a, then the portion of the arm forming the sides of this hole serves as fulcrums for the half-nuts, and as the taper-screw continues to force the lower ends apart the upper ends clamp the screw F. The tapering of the shank portion 2 2 of the nut causes the body of the nut to draw down to a shoulder on the top of the arm a, and also prevents the liability of the nuts to fall out when the screws 3 3 are loosened too much. Now, the several parts being in place, to adjust the instrument for use turn up on the screws 3 3 until the screw F moves evenly forward and back without backlash. This is the condition for common use, and the points of the legs cannot be moved except by turning the screw F; but it often happens that a workman wishes to turn a piece of work to an exact size, and then it is necessary that the calipers shall not be changed by accident. In such a case set the instrument accurately and then turn up the screws 3 3, thereby clamping the screw F, so that there is no liability to change.

Now, the advantages of my invention are: First, the legs are held securely from movement in either direction without depending on a spring, and consequently suitable for inside or outside calipers; secondly, all looseness produced by the wear of the several parts is taken up in a simple and effective manner; thirdly, the whole can be clamped firmly in place, thus forming a useful and novel instrument.

Now, having fully described the construction and operation of my invention, what I claim as new, and desire to secure by Letters Patent, is—

The combination of the half nuts 1 1 with the taper-screw 3, when constructed, operating, and applied substantially in the manner and for the purpose herein fully set forth.

C. A. FAIRFIELD.

Witnesses:
C. J. BURNETT,
MILTON BRADLEY.